US007029651B2

United States Patent
Canós et al.

(10) Patent No.: US 7,029,651 B2
(45) Date of Patent: Apr. 18, 2006

(54) MICROPOROUS CRYSTALLINE MATERIAL (ITQ-19) WITH LAMINAR CHARACTERISTICS, PREPARATION METHOD AND USE THEREOF AS A CATALYST IN THE CATALYTIC CONVERSION OF ORGANIC COMPOUNDS

(75) Inventors: Avelino Corma Canós, Valencia (ES); Urbano Díaz Morales, Valencia (ES); Vicente Fornes Segui, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 202 days.

(21) Appl. No.: 10/630,368

(22) Filed: Jul. 30, 2003

(65) Prior Publication Data

US 2004/0077484 A1  Apr. 22, 2004

Related U.S. Application Data

(63) Continuation of application No. PCT/ES02/00041, filed on Jan. 30, 2002.

(30) Foreign Application Priority Data

Jan. 30, 2001  (ES)  ............... 200100268

(51) Int. Cl.
*C01B 39/48* (2006.01)

(52) U.S. Cl. ............... 423/718; 423/706; 423/707; 423/708; 423/329.1; 208/27; 208/28; 585/475; 502/60

(58) Field of Classification Search ............... 423/706, 423/707, 708, 718, 329.1; 28/27, 28; 585/475; 502/60
See application file for complete search history.

(56) References Cited

U.S. PATENT DOCUMENTS

| 3,642,434 A | * | 2/1972 | Dwyer | 423/705 |
| 3,692,470 A | * | 9/1972 | Ciric | 423/706 |
| 4,331,643 A | * | 5/1982 | Rubin et al. | 423/706 |
| 4,414,189 A | * | 11/1983 | Kokotailo et al. | 423/715 |
| 4,855,270 A | * | 8/1989 | Haddad et al. | 502/64 |
| 5,958,370 A | * | 9/1999 | Zones et al. | 423/706 |
| 6,710,218 B1 | * | 3/2004 | Pop et al. | 585/640 |

FOREIGN PATENT DOCUMENTS

JP   2003073115 A  *  3/2003

\* cited by examiner

*Primary Examiner*—David Sample
(74) *Attorney, Agent, or Firm*—Klauber & Jackson

(57) ABSTRACT

The invention relates to a novel microporous crystalline material ITQ-19 used in the catalytic conversion of organic compounds, such as, for example, the dewaxing and isodewaxing of paraffins and the disproportionation of toluene. Said material has a characteristic X-ray diffractogram, a high absorption capacity and the empirical formula $x(M_{1/n}XO_2)$: $yYO_2:(1-y)SiO_2$ wherein x has a value less than 0.2; y has a value less than 0.1; M is at least an inorganic cation with a +n charge; X is at least a chemical element having oxidation state +3, preferably selected among Al, Ga, B, Cr, Fe; Y is at least a chemical element with oxidation stated +4, preferably selected among Ge, Ti, Sn, V. The inventive material can be obtained by means of a preparation process involving the use of one or more organic additives in a reaction mix which is crystallized by heating.

20 Claims, 1 Drawing Sheet

MICROPOROUS CRYSTALLINE MATERIAL (ITQ-19) WITH LAMINAR CHARACTERISTICS, PREPARATION METHOD AND USE THEREOF AS A CATALYST IN THE CATALYTIC CONVERSION OF ORGANIC COMPOUNDS

RELATED APPLICATIONS

The present application is a Continuation of co-pending PCT Application No. PCT/ES02/00041, filed Jan. 30, 2002 which in turn, claims priority from Spanish Application Serial No. 200100268, filed on Jan. 30, 2001. Applicants claim the benefits of 35 U.S.C. §120 as to the PCT application and priority under 35 U.S.C. §119 as to said Spanish application, and the entire disclosures of both applications are incorporated herein in their entireties.

TECHNICAL FIELD OF THE INVENTION

The present invention belongs to the sector of microporous zeolitic materials, particularly to synthetic laminar zeolitic materials and more specifically to catalysts corresponding to such materials.

1. Objects of the Invention

The first object of the present invention is a microporous crystalline material with laminar characteristics useful as a catalyst in the dewaxing and isodewaxing of paraffins and toluene disproportionation.

A second object of the invention is a method for the preparation of the microporous zeolitic material and the most suitable conditions for synthesis thereof in order to obtain a product that can be used as an adsorbent and catalyst in processes in which organic molecules take part.

A third object of the invention is the use of the above-cited material, in catalytic conversion processes of organic compounds as a catalyst in catalytic conversion processes of organic compounds, such as dewaxing and isodewaxing of paraffins and toluene disproportionation.

2. Prior Art

Natural as well as synthetic zeolitic materials have very interesting catalytic properties for various types of conversion of hydrocarbonaceous compounds. These materials have a defined structure, that is determined by X-ray diffraction, having a large number of small cavities which may be interconnected by even smaller channels or pores. These cavities and pores are uniform and repetitive within each one of the zeolitic materials. Due to the molecular dimension of these pores molecules of a certain size can be adsorbed and other larger ones can be rejected. These materials are known as "molecular sieves" and are used in a multitude of uses that employ this characteristic as an advantage.

Such molecular sieves include a wide variety of crystalline silicates which are described as rigid three-dimensional framework formed by tetrahedrons of $SiO_4$ or of any other $T^{+4}$ metal. There is the possibility of introducing acidity upon replacing in the lattice of the molecular sieve, some $T^{+4}$ cations by $T^{+3}$ cations, such as aluminum, which give rise to a structural charge deficiency that may be compensated for by protons, Bronsted acidity, and/or high charge-radius ratio cations, Lewis acidity. These compensation cations may be totally or partially exchanged by another type of cation using conventional exchange techniques. Hence, it is possible to vary the properties of a silicate specifically according to the chosen cation. This type of microporous material is used as selective adsorbents and/or catalysts in petrochemical and refining processes, as well as fine chemistry.

DESCRIPTION OF THE INVENTION

The present invention refers to a microporous material of zeolitic nature (also known as ITQ-19 in the present specification), that has a composition, in an anhydrous and calcined state, in accordance with the empirical formula

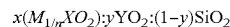
$$x(M_{1/n}XO_2):yYO_2:(1-y)SiO_2$$

wherein x has a value less than 0.2, preferably less than 0.1, and more preferably less than 0.02, and it may have the value 0;

y has a value less than 0.1, preferably less than 0.05, and more preferably less than 0.02; and it may have the value 0.

M is at least one +n charge inorganic cation and may be H;

X is at least one chemical element with a +3 oxidation state, preferably selected among Al, Ga, B, Cr, Fe;

Y is at least one chemical element with a +4 oxidation state, preferably selected among Ge, Ti, Sn, V.

In a calcinated state at 540° C., the material of the invention has an X-ray diffraction pattern with the basal spacings and relative intensities indicated in Table 1.

TABLE 1

| d(Å) | (I/IO) * 100 | d(Å) | (I/IO) * 100 |
| --- | --- | --- | --- |
| 11.95 ± 0.02 | w | 3.82 ± 0.05 | m |
| 9.19 ± 0.03 | vs | 3.69 ± 0.03 | w |
| 6.85 ± 0.01 | s | 3.46 ± 0.07 | s |
| 6.12 ± 0.05 | w | 3.32 ± 0.06 | m |
| 5.53 ± 0.03 | w | 3.25 ± 0.08 | w |
| 4.86 ± 0.06 | w | 3.07 ± 0.03 | w |
| 4.73 ± 0.04 | w | 2.98 ± 0.04 | w |
| 4.60 ± 0.02 | w | 2.88 ± 0.05 | w |
| 4.48 ± 0.05 | w | 2.82 ± 0.06 | w |
| 4.35 ± 0.04 | w | 2.66 ± 0.07 | w |
| 4.23 ± 0.02 | w | 2.56 ± 0.05 | w |
| 4.11 ± 0.03 | w | 2.43 ± 0.09 | w |
| 3.89 ± 0.04 | m | 2.35 ± 0.08 | w | wherein
w is a weak relative intensity between 0 and 20%;
m is an average relative intensity between 20 & 40%;
s is an average relative intensity between 40 and 60%;
vs is an average relative intensity between 60 and 100%.

This material has a microporous structure and a high thermal stability; it can have Bronsted and Lewis acid centers and can be prepared in the purely siliceous form.

Preferably, the Si/X ratio is from 30 to 400.

This material may be obtained by calcinating a precursor (also known as PREITQ-19 in the present specification), which precursor has, in a dry state, an X-ray diffraction pattern according to the basal spacings and relative intensities indicated in Table 2.

TABLE 2

| d(Å) | (I/IO) * 100 | d(Å) | (I/IO) * 100 |
| --- | --- | --- | --- |
| 11.22 ± 0.02 | vs | 3.60 ± 0.08 | s |
| 10.10 ± 0.03 | w | 3.52 ± 0.05 | vs |
| 8.81 ± 0.05 | w | 3.42 ± 0.06 | s |
| 7.05 ± 0.01 | w | 3.36 ± 0.04 | s |
| 6.30 ± 0.01 | m | 3.32 ± 0.05 | w |
| 5.60 ± 0.02 | w | 3.30 ± 0.01 | w |
| 5.28 ± 0.05 | s | 3.14 ± 0.07 | w |

TABLE 2-continued

| d(Å) | (I/IO) * 100 | d(Å) | (I/IO) * 100 |
|---|---|---|---|
| 4.98 ± 0.06 | s | 3.10 ± 0.02 | w |
| 4.72 ± 0.01 | w | 3.09 ± 0.03 | w |
| 4.38 ± 0.02 | s | 3.01 ± 0.01 | w |
| 4.21 ± 0.02 | s | 2.81 ± 0.04 | w |
| 3.90 ± 0.03 | w | 2.61 ± 0.04 | w |
| 3.83 ± 0.08 | m | 2.51 ± 0.05 | w |
| 3.73 ± 0.07 | a | 2.48 ± 0.09 | w | wherein
w is a weak relative intensity between 0 and 20%;
m is an average relative intensity between 20 & 40%;
s is an average relative intensity between 40 and 60%;
vs is an average relative intensity between 60 and 100%.

On the other hand, the precursor PREITQ-19, since it is calcinated at temperatures higher than 300° C., collapses and gives rise to the three-dimensional structure of ITQ-19.

In an embodiment of the material ITQ-19, the material has a composition, in anhydrous and calcinated state, of the empirical formula $$x(M_{1/n}XO_2):yYO_2:(1-y)SiO_2$$

wherein
x has a value of 0.0025 to 0.035;
M is at least one inorganic cation with an n valence, and it can be, for example Li,
X is Al, and
y is zero.

The embodiment of the material ITQ-19 corresponding to this empirical formula, in turn corresponds to the following formula expressed in terms of moles of oxide per mol of silica, $$(0.05)M_2/nO:(0-0.0335)Al_2O_3:SiO_2$$

wherein M is at least one inorganic cation with an n valence.

In accordance with the invention the inorganic cation M conveniently has a compensation cation function and can be selected at least partially from among hydrogen and alkaline metals like Li, Na and K.

The present invention also refers to a process for preparation of the material ITQ-19. Such process comprises the following stages:

A precursor is prepared in a first step by subjecting to heating, with or without stirring, at a temperature between 100 and 225° C., preferably between 125 and 200° C., a reaction mixture that contains water and a $SiO_2$ source, that preferably has, in order to enhance the formation of the final material ITQ-19 without the presence of liquid phases considered as impurities, at least 30% of solid silica, such as for example AEROSIL, LUDOX, ULTRASIL, HISIL or tetraethylorthosilicate (TEOS), optionally a source of at least another tetravalent element Y preferably selected among Ge, Ti, V, Sn, optionally a source of at least another trivalent element X preferably selected among Al, B, Ga, Fe, Cr, an organic cation 1-methyl-1,4-diazabicyclo[2,2,2]octane as a structure directing agent, and optionally an inorganic cation, preferably a source of alkaline metal such as for example an oxide, hydroxide or salt of lithium, sodium or potassium, until crystallization of the reaction mixture is achieved.

The reaction mixture has a composition, in terms of molar ratios of oxides, comprised between the ranges:
ROH/$SiO_2$=0.01–1.0, preferably 0.1–1.0,
$M_{1/n}$OH/$SiO_2$=0–1.0, preferably 0–0.2,
$X_2O_3$/SiO2=0–0.1, preferably 0–0.05, and more preferably 0–0.01,
$YO_2$/($YO_2$+$SiO_2$) less than 1, preferably less than 0.1,
$H_2O$/$SiO_2$=0–100, preferably 1–50, wherein
M is at least a +n charge inorganic cation;
X is at least a trivalent element preferably selected among Al, B, Ga. Fe and Cr;
Y is at least a trivalent element preferably selected among Ge, Ti, Sn, V;
R is an organic cation, preferably 1-methyl-1,4-diazabicyclo[2,2,2]octane (DABCO), which may be added in hydroxide form and another salt to the reaction mixture.

The definition of the reaction mixture based on its empirical formula is the following:

$$rROH:aM_{1/n}OH:xX_2O_3:yYO_2:(1-y)SiO_2:zH_2O$$

wherein M, X and Y have the above-cited meanings and wherein
r=0.01–1.0, preferably 0.1–1.0
a=0–1.0, preferably 0–0.2
x=0–0.1, preferably 0–0.5, and more preferably 0–0.01
y is less than 1, preferably less than 0.1
z=0–100, preferably 1–50.

The reaction mixture preferably has a composition, in terms of molar ratios of oxides, comprised among the ranges
$SiO_2$/$Al_2O_3$=15,199, preferably 50–199,
$H_2O$/$SiO_2$=10–200, preferably 20–100,
$OH^-$/$SiO_2$=0.01–2, preferably 0.1–1,
R/$SiO_2$=0.02–1, preferably 0.05–0.75,
M/$SiO_2$=0.01–3, preferably 0.05–2, wherein
M is at least a +n charge inorganic cation;
R is an organic cation, preferably 1-methyl-1,4-diazabicyclo[2,2,2]octane (DABCO), in the form of hydroxide and another salt can be added to the reaction mixture.

In one embodiment, the reaction mixture is, in terms of moles of oxide per mole of silica, the following:

$$(0.1-1)ROH:0-0.05)M_{1/n}OH:0.0025-0.335)Al_2O_3:SiO_2:zH_2O$$

wherein
M has the above-cited meaning,
R is an organic cation that acts as a structure directing agent, and
z is a value of 0 to 100, preferably 1–50.

In accordance with the above, the precursor PREITQ-19, upon being calcinated at temperatures higher than 300° C., collapses and gives rise to the three-dimensional structure of the ITQ-19.

Adding the trivalent element or elements and/or tetravalent elements can be done prior to the heating of the reaction mixture or in a intermediate phase during heating.

Optionally, an amount of crystalline material, preferably with the characteristics of the material ITQ-19, as crystallization promoter, can be added to the reaction mixture. The amount of this promoter material is comprised between 0.01 to 15%, preferably 0.05 to 5% by weight referred to the total amount of silica added.

The first step normally has a duration of between 1 and 30 days, preferably 2 to 15 days and it normally proves to be a white solid.

Then in a second step the precursor is washed, preferably with distilled water, filtered, dried and subjected to calcination. Such calcination can be carried out in an air flow, at a temperature between 300° C. and 800° C., preferably between 400 and 600° C. for at least 3 hours.

BRIEF DESCRIPTION OF THE DRAWINGS

As an integral part of the present specification, some drawings are attached hereto, wherein.

EMBODIMENTS OF THE INVENTION

Some examples of the embodiment of the invention will be described hereinafter.

EXAMPLES

Example 1

A purely siliceous laminar precursor PREITQ-19 is described in this first example. The synthesis gel was prepared using: lithium hydroxide (Fisher), monomethylated 1-methyl-1,4-diazabicyclo[2,2,2]octane hydroxide (DABCO) and an aqueous silica solution (30% by weight) (HS-30 Dupont, Aldrich.).

0.175 g. $LiOH.H_2O$, 108.18 g. DABCO-Me-OH (0.5 M) and 16.667 g. $SiO_2$ (30% by weight) are mixed and stirred vigorously in a thermostatic bath at 50° C. until the 52.1521 g. of water present in the mixture evaporate. Hence, we obtain a synthesis gel, with a pH close to 13, with the following molar composition:

0.05 LiOH:0.65 R—OH:0.01 $SiO_2$:40 $H_2O$ (R=Methylated DABCO).

Afterwards, the gel is introduced in stainless steel autoclaves with TEFLON covers and left for 7 days at 175° C. with a stirring speed of 60 rpm.

Figure 2:
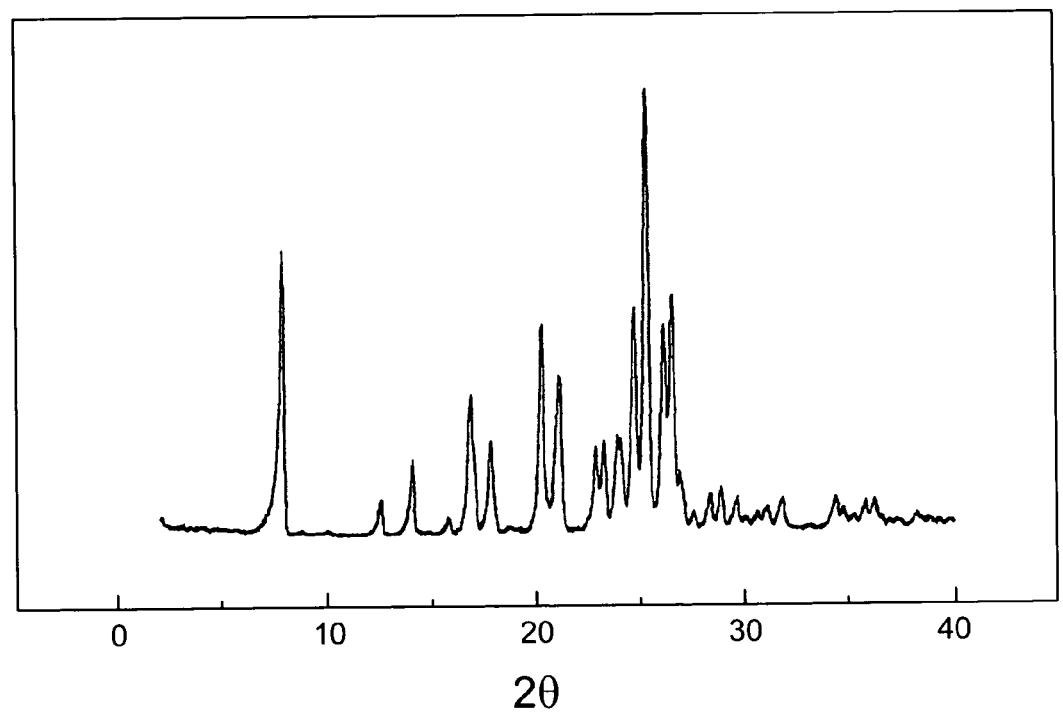
FIG. 2 is a diffractogram of a typical precursor PREITQ-19 as a precursor of the material ITQ-19.

After this treatment, the samples are filtered and washed with distilled water until the pH of the washing water is <9. Drying is done afterwards in order to obtain the laminar precursor PREITQ-19, whose X-ray diffractogram coincides with the one of FIG. 2, with relative intensities and basal spacings coinciding with those shown on table 2.

Example 2

Figure 1:
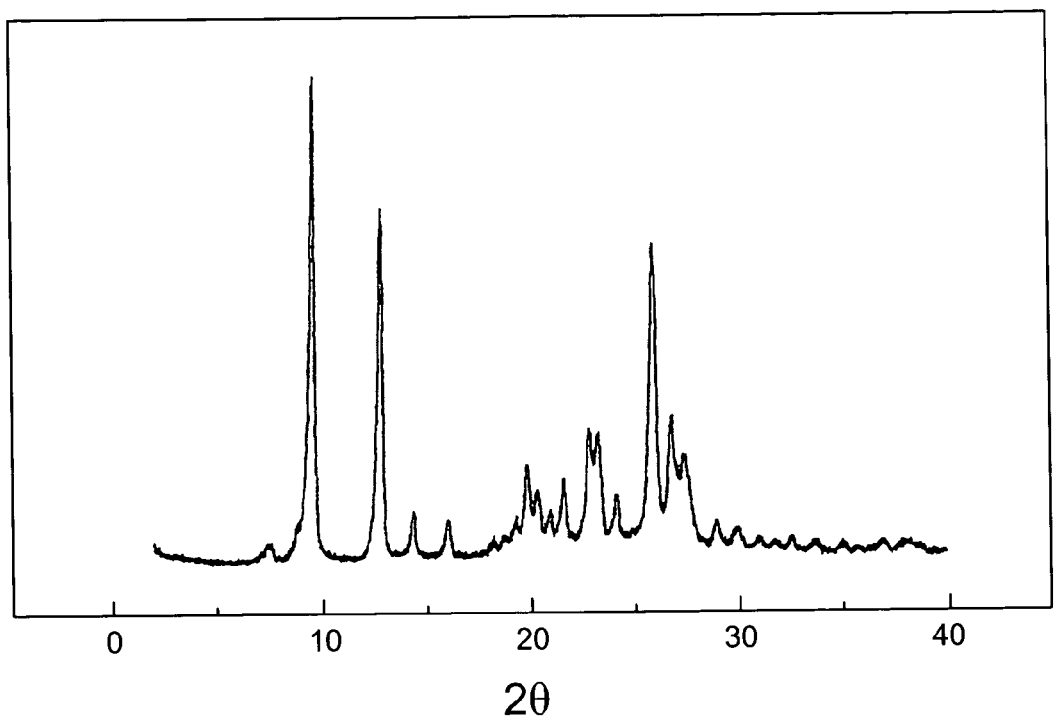
FIG. 1 is a diffractogram of a typical sample of the material ITQ-19.

A portion of the laminar precursor PREITQ-19 obtained in example 1 is calcinated at 540° C. for three hours in an air flow, obtaining the collapsed material with a three-dimensional structure named ITQ-19 that has an X-ray diffractogram that is shown in FIG. 1 with relative intensities and basal spacings coinciding with those shown in table 1.

Example 3

0.175 g. of LiOH. $H_2O$, 41.6 g. of DABCO-Me-OH (0.5 M), 9.620 g. of milli-Q $H_2O$ and 16.667 g. of $SiO_2$ (30% by weight are mixed and stirred vigorously for 1 hour at room temperature, obtaining a gel that has a pH of 12.60. This synthesis gel has the following molar composition:

0.05 LiOH:0.25 R—OH:1 $SiO_2$:40 $H_2O$ (R=Methylated DABCO).

Afterwards, the gel is introduced in stainless steel autoclaves with TEFLON covers and left for 12 days at 175° C. with a stirring speed of 60 rpm.

After this treatment, the samples are filtered and washed with distilled water until the pH of the washing water is <9. Drying at 60° C. is done afterwards in order to obtain the laminar precursor PREITQ-19, whose X-ray diffractogram coincides with the one of FIG. 2, with relative intensities and basal spacings coinciding with those shown on table 2.

Example 4

When we calcine the material PREITQ-19 obtained in example 3, for 5 hours at a temperature of 540° C., the zeolitic material ITQ-19 claimed in this patent is obtained, its X-ray diffractogram basically coinciding with the one of FIG. 1, with relative intensities and basal spacings coinciding with the ones shown on table 1.

Example 5

This example describes the preparation of the laminar precursor PREITQ-19. The synthesis gel was prepared by using lithium hydroxide (Fisher), alumina (pseudoboehmite, 73.7% by weight, Catapal B Vista), monomethylated DABCO hydroxide (1-methyl-1,4-diazabicyclo[2,2,2]octane) and an aqueous solution of silica (30% by weight) (HS-30 LUDOX, Aldrich).

0.132 g. of $LioH.H_2O$, 0.09 g. of $Al_2O_2$ (73–7% by weight), 81.135 g. DABCO-Me-OH (0.5 M) and 12.501 g. of $SiO_2$ (30% by weight) are mixed and stirred vigorously in a thermostatic bath at 50° C. until the 39.141 g. of water present in the mixture evaporate. Thus, we achieve a synthesis gel with a pH close to 13, with the following molar composition:

0.05 LiOH:0.65 R—OH:0.01 $Al_2O_3$:1 $SiO_2$:40 $H_2O$ (R=Methylated DABCO).

Afterwards, the gel is introduced in stainless steel autoclaves with TEFLON covers and left for 7 days at 175° C. with a stirring speed of 60 rpm.

After this treatment, the samples are filtered and washed with distilled water until the pH of the washing water is <9. Drying is done afterwards in order to obtain the laminar precursor PREITQ-19, whose X-ray diffractogram coincides with the one of FIG. 2, with relative intensities and basal spacings coinciding with those shown on table 2.

Example 6

A portion of the laminar precursor PREITQ-19 obtained in example 5 is calcinated at 540° C. for three hours in an air flow, obtaining the collapsed material with a three-dimensional structure named ITQ-19 that has an X-ray diffractogram that is shown in FIG. 1 with relative intensities and basal spacings coinciding with those shown in table 1.

Example 7

0.132 g. of $LiOH.H_2O$, 0.09 g. of $Al_2O_2$ (73.7% by weight), 41.6 g. DABCO-Me-OH (0.5 M) 9.620 g. of milli-Q $H_2O$ and 12,501 g. g. of $SiO_2$ (30% by weight) are mixed and stirred vigorously for 1 hour at room temperature, obtaining a synthesis gel with a pH close to 12.60. This synthesis gel has the following molar composition:

0.05 LiOH:0.25 R—OH:0.01 $Al_2O_3$:1 $SiO_2$:40 $H_2O$ (R=Methylated DABCO).

Afterwards, the gel is introduced in stainless steel autoclaves with TEFLON covers and left for 12 days at 175° C. with a stirring speed of 60 rpm.

After this treatment, the product is filtered and washed with distilled water until the pH of the washing water is <9. Drying at 60° C. is done afterwards in order to obtain the laminar precursor PREITQ-19, whose X-ray diffractogram coincides with the one of FIG. 2, with relative intensities and basal spacings coinciding with (similar to) those shown on table 2.

Example 8

When we calcine the material PREITQ-19 obtained in example 7, for 5 hours at a temperature of 540° C., the zeolitic material ITQ-19 claimed in this patent is obtained, its X-ray diffractogram basically coinciding with the one of FIG. 1, with relative intensities and basal spacings coinciding with the ones shown on table 1.

The invention claimed is:

1. A microporous crystalline material of zeolitic nature, having the empirical formula:

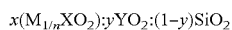

$x(M_{1/n}XO_2):yYO_2:(1-y)SiO_2$ wherein
x has a value less than 0.2;
y has a value less than 0.1:
M is at least one +n charge inorganic cation,
X is at least one chemical element with a +3 oxidation state
Y is at least one chemical element with a +4 oxidation state
and in that, in an anhydrous and calcinated state, at 540° C., an X-ray diffraction pattern in accordance with

| d(Å) | (I/IO) * 100 | d(Å) | (I/IO) * 100 |
|---|---|---|---|
| 11.95 ± 0.02 | w | 3.82 ± 0.05 | m |
| 9.19 ± 0.03 | vs | 3.69 ± 0.03 | w |
| 6.85 ± 0.01 | s | 3.46 ± 0.07 | s |
| 6.12 ± 0.05 | w | 3.32 ± 0.06 | m |
| 5.53 ± 0.03 | w | 3.25 ± 0.08 | w |
| 4.86 ± 0.06 | w | 3.07 ± 0.03 | w |
| 4.73 ± 0.04 | w | 2.98 ± 0.04 | w |
| 4.60 ± 0.02 | w | 2.88 ± 0.05 | w |
| 4.48 ± 0.05 | w | 2.82 ± 0.06 | w |
| 4.35 ± 0.04 | w | 2.66 ± 0.07 | w |
| 4.23 ± 0.02 | w | 2.56 ± 0.05 | w |
| 4.11 ± 0.03 | w | 2.43 ± 0.09 | w |
| 3.89 ± 0.04 | m | 2.35 ± 0.08 | w | wherein
w is a weak relative intensity between 0 and 20%;
m is a relative intensity between 20 & 40%;
s is a relative intensity between 40 and 60%;
vs is a relative intensity between 60 and 100%.

2. A crystalline material according to claim 1, wherein
x has a value less than 0.1,
y has a value less than 0.05.

3. A crystalline material according to claim 1, wherein x has the value of 0.

4. A crystalline material according to claim 1, wherein M is H.

5. A material according to claim 1, wherein
x has a value of 0.0025 to 0.035;
M is at least one inorganic cation with an n valence,
X is Al, and
y is zero.

6. A material according to claim 1, wherein M is selected from the group consisting of hydrogen and alkali metals.

7. A material according to claim 1, wherein M is selected form the group consisting of Li, Na, K and combinations thereof.

8. A material according to claim 1, wherein M is Li.

9. A material according to claim 1, having a Si/X ratio between 30 and 400.

10. A material according to claim 1, wherein before calcination it is a precursor with an X-ray diffractogram according to

| d(Å) | (I/IO) * 100 | d(Å) | (I/IO) * 100 |
|---|---|---|---|
| 11.22 ± 0.02 | vs | 3.60 ± 0.08 | s |
| 10.10 ± 0.03 | w | 3.53 ± 0.05 | vs |
| 8.81 ± 0.05 | w | 3.42 ± 0.06 | s |
| 7.05 ± 0.01 | w | 3.36 ± 0.04 | s |
| 6.30 ± 0.01 | m | 3.32 ± 0.05 | w |
| 5.60 ± 0.02 | w | 3.30 ± 0.01 | w |
| 5.28 ± 0.05 | s | 3.14 ± 0.07 | w |
| 4.98 ± 0.06 | s | 3.10 ± 0.02 | w |
| 4.72 ± 0.01 | w | 3.09 ± 0.03 | w |
| 4.38 ± 0.02 | s | 3.01 ± 0.01 | w |
| 4.21 ± 0.02 | s | 2.81 ± 0.04 | w |
| 3.90 ± 0.03 | w | 2.61 ± 0.04 | w |
| 3.83 ± 0.08 | m | 3.51 ± 0.05 | w |
| 3.73 ± 0.07 | m | 2.48 ± 0.09 | w. |

11. A process to synthesize the crystalline material of claim 1, comprising
a first step wherein a precursor is prepared by subjecting to heating, with or without stirring, at a temperature between 100 and 225° C., a reaction mixture that contains
a SiO$_2$ source,
optionally a source of at least another tetravalent element Y,
optionally a source of at least another trivalent element X
an organic cation as a structure directing agent,
optionally an inorganic cation,
and water,
wherein the reaction mixture has a composition, in terms of molar ratios of oxides, comprised in the ranges of
ROH/SiO$_2$=0.01–1.0,
M$_{1/n}$OH/SiO$_2$=0–1.0,
X$_2$O$_3$/SiO$_2$=0–0.1,
YO$_2$/(YO$_2$+SiO$_2$) less than 1,
H$_2$O/SiO$_2$=0–100,
wherein
M is at least one +n charge inorganic cation;
X is at least a trivalent element,
Y is at least a tetravalent element,
R is an organic cation,
until crystallization of the reaction mixture is achieved;
a second stage wherein the precursor is dried and subjected to calcination.

12. A process according to claim 11, wherein the organic cation 1-methyl-1,4-diazabicyclo[2,2,2] octane is added in the form of a hydroxide and another salt, to the reaction mixture.

13. A process according to claim 11 or 12, wherein the precursor is calcinated in an air flow, at a temperature between 300° C. and 800° C. for at least 3 hours.

14. A process according to claim 11, wherein an amount of crystalline material, is added to the reaction mixture as a crystallization promoter, said amount being comprised between 0.01 and 15%, by weight referred to the total amount of silica added.

15. A catalyst in the catalytic conversion process of organic compounds comprising a microporous crystalline material of zeolitic nature defined in claim 1.

16. A method of dewaxing of paraffins comprising contacting said paraffins with the catalyst of claim 15.

17. A method for the isodewaxing of wax comprising contacting said wax with the catalyst of claim 15.

18. A method for toluene deproportionation comprising contacting said toluene with the catalyst of claim 15.

19. A microporous crystalline material of zeolitic nature, according to claim 1, wherein X is at least one chemical element with a +3 oxidation state, selected from the group consisting of Al, Ga, B, Cr and Fe.

20. A microporous crystalline material of zeolitic nature, according to claim 1, wherein Y is at least one chemical element with a +4 oxidation state selected from the group consisting of Ge, Ti, Sn and V.

* * * * *